(12) United States Patent
Call

(10) Patent No.: US 11,679,750 B2
(45) Date of Patent: Jun. 20, 2023

(54) BRAKE EQUIPMENT WEAR MONITORING FOR REMAINING USEFUL LIFE

(71) Applicant: NEW YORK AIR BRAKE, LLC, Watertown, NY (US)

(72) Inventor: Derick Call, Evans Mills, NY (US)

(73) Assignee: NEW YORK AIR BRAKE, LLC, Watertown, NY (US)

( * ) Notice: Subject to any disclaimer, the term of this patent is extended or adjusted under 35 U.S.C. 154(b) by 998 days.

(21) Appl. No.: 16/434,227

(22) Filed: Jun. 7, 2019

(65) Prior Publication Data

US 2020/0384974 A1 Dec. 10, 2020

(51) Int. Cl.
*B60T 17/22* (2006.01)
*F16D 66/02* (2006.01)
*F16D 66/00* (2006.01)

(52) U.S. Cl.
CPC .......... *B60T 17/228* (2013.01); *F16D 66/021* (2013.01); *B60T 2210/30* (2013.01); *B60T 2270/88* (2013.01); *F16D 66/00* (2013.01); *F16D 2066/001* (2013.01); *F16D 2066/005* (2013.01)

(58) Field of Classification Search
CPC ...... B60T 8/885; B60T 8/1705; B60T 17/228; B60T 13/662; B60T 13/665; B60T 2210/30; B60T 2270/406; B60T 2270/413; F16D 66/00; F16D 66/02; F16D 66/021; F16D 2066/001; F16D 2066/005
See application file for complete search history.

(56) References Cited

U.S. PATENT DOCUMENTS

| 5,596,513 A | 1/1997 | Schricker |
| 2012/0078454 A1* | 3/2012 | Kumar ................. B60T 17/228 |
| | | 701/19 |

FOREIGN PATENT DOCUMENTS

| EP | 1800982 A1 * | 6/2007 | ............. B60T 17/22 |
| GB | 2377735 A * | 1/2003 | ............. B61H 5/00 |
| GB | 2533940 A * | 7/2016 | ........... B60T 17/228 |
| GB | 2533940 A | 7/2016 | |

(Continued)

OTHER PUBLICATIONS

English machined translation of JP-6207075 B2, Oct. 4, 2017.*

(Continued)

*Primary Examiner* — Nicholas J Lane
*Assistant Examiner* — San M Aung
(74) *Attorney, Agent, or Firm* — David Nocilly

(57) ABSTRACT

A system for monitoring usage of rail car brake equipment and determining whether the actual lifespan of the brake equipment is shorter than an expected lifespan had the brake equipment been used under normal or constant parameters. The system includes a sensor for collecting and outputting data indicating how the brake equipment has been actually used. A controller is programmed to receive the data regarding how the brake system component has been used and to calculate whether the brake system component has an estimated lifespan that is shorter than the expected lifespan. The sensor may comprise an ambient temperature sensor, a flow sensor that determines the air used by the braking system that includes the brake system component, and/or a pressure sensor that can determines how frequently and in what manner the brake system has been used.

14 Claims, 18 Drawing Sheets

(56) References Cited

FOREIGN PATENT DOCUMENTS

JP 6207075 B2 10/2017
WO WO-2017050770 A1 * 3/2017 ............ B60T 13/662

OTHER PUBLICATIONS

International Search Report and Non-Translated Written Opinion Form PCT/IS/210 and PCT/ISA/237, International Application No. PCT/US2019/035935, pp. 1-13, International Filing Date Jun. 7, 2019, search report dated Feb. 12, 2020.

* cited by examiner

|  | Cold Climate | | Hot Climate | |
| --- | --- | --- | --- | --- |
| Temp (°F) | Real Total Hours | Accumulated Heat Age Hours | Total Hours | Accumulated Heat Age Hours |
| -55 | 105.12 | 0.00 | | 0.00 |
| -45 | 315.36 | 0.00 | | 0.00 |
| -35 | 1051.2 | 0.00 | 0 | 0.00 |
| -25 | 4204.8 | 0.00 | 0 | 0.00 |
| -15 | 15768 | 0.03 | 0 | 0.00 |
| -5 | 79891.2 | 0.28 | 0 | 0.00 |
| 5 | 118785.6 | 0.85 | 0 | 0.00 |
| 15 | 138758.4 | 1.98 | 0 | 0.00 |
| 25 | 167140.8 | 4.76 | 0 | 0.00 |
| 35 | 127195.2 | 7.24 | 630.72 | 0.04 |
| 45 | 153475.2 | 17.48 | 136781.12 | 15.58 |
| 55 | 138758.4 | 31.61 | 508573.28 | 115.39 |
| 65 | 71481.6 | 32.57 | 284980.32 | 129.83 |
| 75 | 18921.6 | 17.24 | 94187.52 | 85.82 |
| 85 | 2102.4 | 3.83 | 23126.4 | 42.14 |
| 95 | | | 4940.64 | 18.01 |
| 105 | | | 0 | 0.00 |
| 115 | | | 0 | 0.00 |
| | | 118 | | 407 |
| Remaining Useful Life | | 76% | | 19% |

FIG. 8

At Year 12

| Year | Accumulated Age |
|---|---|
| 1 | 25 |
| 2 | 75 |
| 3 | 125 |
| 4 | 150 |
| 5 | 175 |
| 6 | 200 |
| 7 | 260 |
| 8 | 310 |
| 9 | 360 |
| 10 | 400 |
| 11 | 460 |
| 12 | 500 |

BRAKE EQUIPMENT WEAR MONITORING FOR REMAINING USEFUL LIFE

BACKGROUND OF THE INVENTION

1. Field of the Invention

The present invention to rail care brake equipment and, more specifically, to a system for determining the actual wear experienced by brake equipment based on usage of the brake equipment.

2. Description of the Related Art

Currently, the rail industry uses brake equipment until the point of failure with no prior indication of the actual health of the equipment. In order to avoid unexpected outages, some railroads have implemented mandatory overhaul periods where brake equipment is repaired or replaced regardless of whether the equipment has, in fact, experienced enough wear that it is need of repair or replacement. Accordingly, there is a need in the art for an approach than can determine how much wear particular equipment has experiences so that the equipment can be repaired or replaced only when such repair or replacement is needed.

BRIEF SUMMARY OF THE INVENTION

The present invention provides a system and method of determining the actual amount of wear of brake equipment and thus the remaining useful lifespan of the brake equipment before repair or replacement will be necessary. In a first embodiment, the system for monitoring usage of rail car brake equipment comprises a sensor for collecting and outputting data regarding at least one parameter indicating how a brake system component having an expected lifespan has been actually used, and a controller coupled to the sensor that is programmed to receive the data regarding the at least one parameter indicating how the brake system component has been used. The controller is further programmed to determine whether the at least one parameter has caused the brake system component to have an actual lifespan that is shorter than the expected lifespan. The sensor may comprise a temperature sensor that can output the ambient temperature, a flow sensor that can determine an amount of air used by a braking system that includes the brake system component, a pressure sensor that can determine an amount of pressure in a brake pipe of a braking system that includes the brake system component, or a pressure sensor that can determine an amount of pressure in a brake cylinder of a braking system that includes the brake system component. The controller may programmed to determine whether the at least one parameter has caused the brake system component have the actual lifespan that is shorter than the expected lifespan by calculating a constructive loss of lifespan according to the actual operation of the brake system component. The controller may be programmed to calculate the constructive loss of lifespan by tracking the at least one parameter over time. The constructive loss of lifespan may be based upon at least one of ambient temperature data collected over time, brake system air flow data collected over time, and brake system cycling data collected over time. The controller is programmed to calculate a remaining useful life by subtracting the constructive loss of lifespan from the expected lifespan of the brake equipment. The system may further comprise a display coupled to the controller, with the controller programmed to drive the display to provide a visual indication of the remaining useful life.

In another embodiment, the present invention comprises a method for monitoring usage of rail car brake equipment. In a first step, the method comprises providing a sensor for collecting and outputting data regarding at least one parameter indicating how a brake system component having an expected lifespan has been actually used and a controller that is coupled to the sensor. In another step, the method comprise receiving the data regarding the at least one parameter indicating how the brake system component has been used with the controller. In a further step, the method comprises determining whether the at least one parameter has caused the brake system component to have an actual lifespan that is shorter than the expected lifespan. The step of determining whether the at least one parameter has caused the brake system component to have an actual lifespan that is shorter than the expected lifespan may comprise the step of calculating the constructive loss of lifespan based upon tracking of the at least one parameter over time. The constructive loss of lifespan may be based upon at least one of ambient temperature data collected over time, brake system air flow data collected over time, and brake system cycling data collected over time. The method may further comprise the step of calculating a remaining useful life by subtracting the constructive loss of lifespan from the expected lifespan of the brake equipment. The method may additionally comprise the step of displaying a remaining useful life based upon the subtracting of the constructive loss of lifespan from the expected lifespan of the brake equipment.

BRIEF DESCRIPTION OF THE SEVERAL VIEWS OF THE DRAWING(S)

The present invention will be more fully understood and appreciated by reading the following Detailed Description in conjunction with the accompanying drawings, in which:

FIG. 8 is a chart comparing the expected remaining lifespan of brake equipment according to the climate in which the equipment has been used;

DETAILED DESCRIPTION OF THE INVENTION

Figure 1:
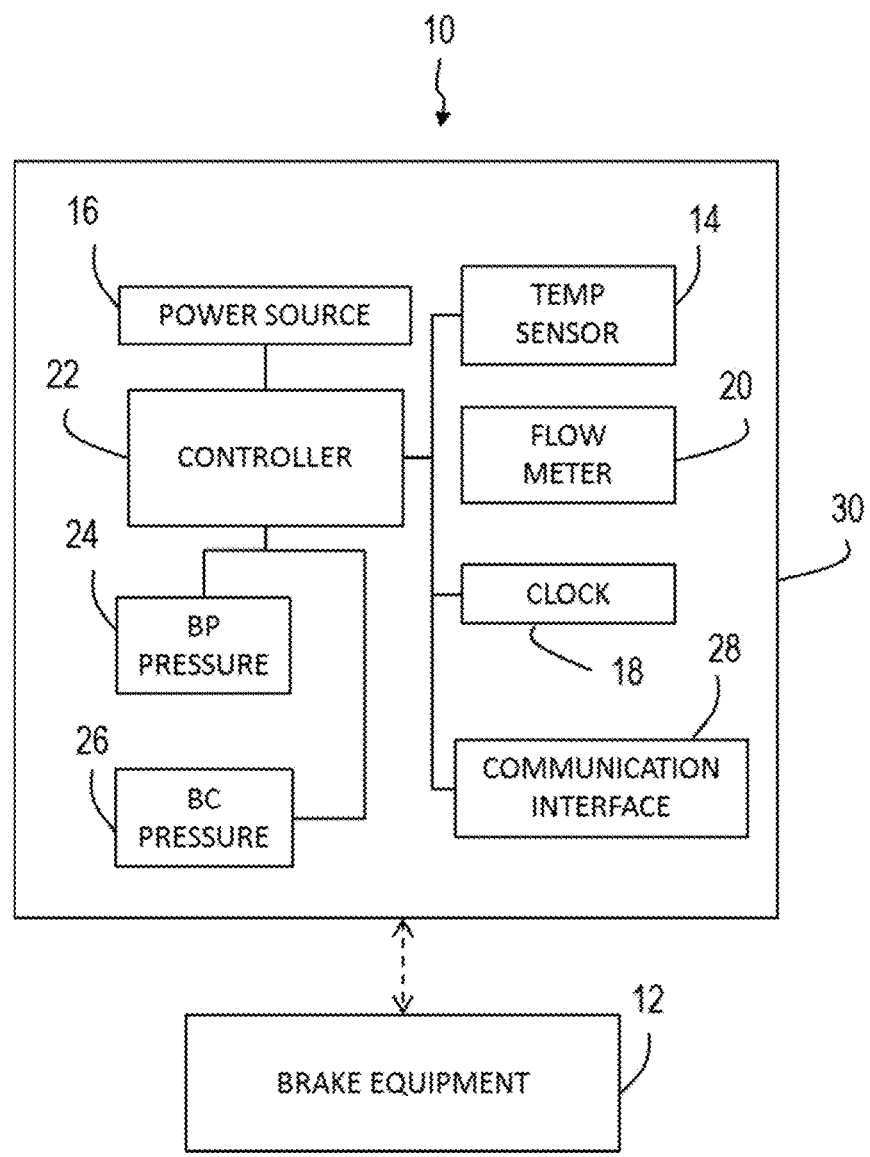
FIG. 1 is a schematic of a brake equipment wear monitoring system according to the present invention.

Referring to the figures, wherein like numeral refer to like parts throughout, there is seen in FIG. 1 a system 10 for monitoring the usage of certain brake equipment 12, such as a particular component of a braking system, and determining how much useful life has been consumed by the passage of time as well as extraordinary usage that causes accelerated loss of lifespan, thereby allowing for the equipment to be repaired or replaced only when necessary and in advance of any failures. Brake equipment 12 may comprise (and has been illustrated in some figures) as a DB-60 control valve, available from New York Air Brake of Watertown, N.Y., that forms the heart of a freight car braking system. Brake equipment 12 may comprise any brake system component that is subject to a change in the amount of actual wear over time depending on ambient conditions or operational conditions, such as an individual valve, a valve component, a gasket, or any other component that must be repaired or replaced to avoid a failure. For example, control valves, combined reservoirs, retaining valves, angle cocks, brake cylinders, dirt collectors, and glad hands all have components, such as rubber seals, that are subject to wear and thus may comprise brake system components monitored by system 10.

More specifically, system 10 comprises a temperature sensor 14 positioned to monitor the ambient temperature in which brake equipment 12 has been used over time. System 10 further comprises a power source 16, a clock 18, and a flow sensor 20. Temperature sensor 14, power source 16, clock 18, and flow sensor 20 are coupled to a controller 22 that is programmed to collect data output from temperature sensor 14, power source 16, clock 18, and flow sensor 20 in order to determine that amount of wear actually experienced by brake equipment 12. System 10 further comprise a brake pipe (BP) pressure sensor 24 and a brake cylinder (BC) pressure sensor 26 for tracking the pressure, and changed in pressure, in those brake system components over time. It should be recognized that additional sensors may be used to collect data for use in determining the remaining lifespan of brake equipment 12. System 10 may additionally include a communication interface 28 for exporting monitoring results to a wayside device, to a remote monitoring station at the back office of the railroad using brake equipment 12, or to a handheld device of railroad personnel, such as those performing routine equipment checks. In one approach, system 10 may comprise a dedicated device having power source 16, clock 18, a single one of sensors 20, 24, or 26, and controller 22 for monitoring a single component, such as a valve having a rubber component, and displaying the remaining useful life as described herein.

Figure 2:
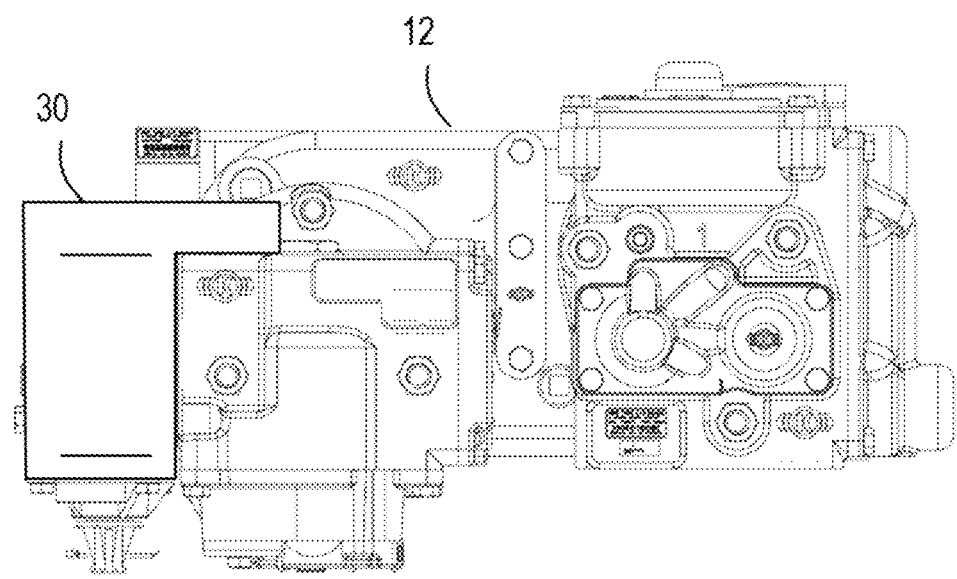
FIG. 2 is a schematic of a first option for incorporating a brake equipment wear monitoring system according to the present invention into a rail car brake valve.
Figure 3:
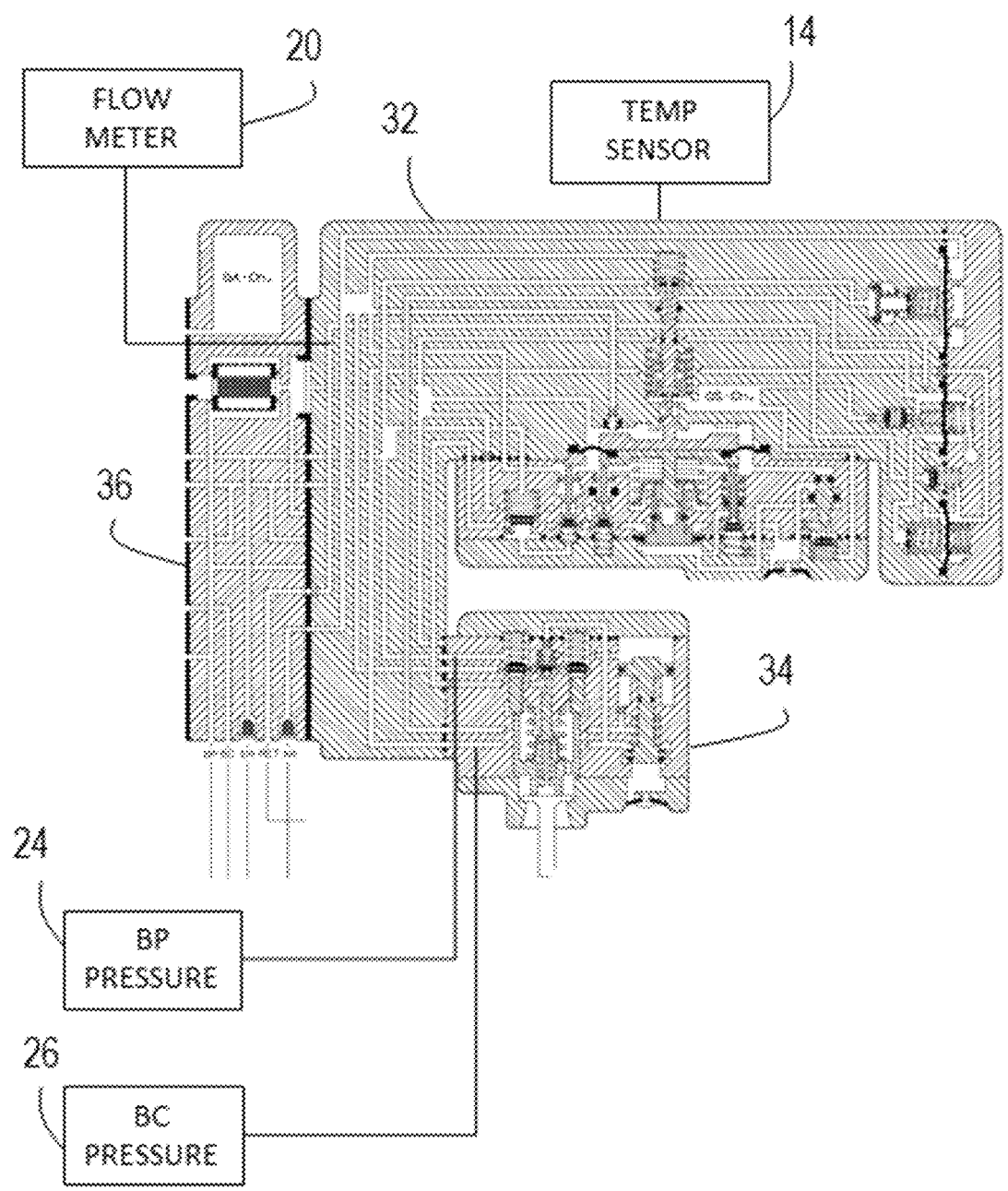
FIG. 3 is a diagram showing a second option for incorporating a brake equipment wear monitoring system according to the present invention into a rail car brake valve.

Referring to FIG. 2, system 10 may be retrofit into existing brake equipment 12, such as by coupling a housing 30 that includes system 10 and has the appropriate pneumatic interfaces of the brake equipment. In the example of a DB 60 freight control valve comprising control valve 32, system 10 may be coupled to the release valve 34 used with control valve 32. For example, brake pipe pressure sensor 24 and brake cylinder pressure sensor 26 can be coupled to the appropriate piping between release valve 34 and control valve 32. Flow sensor 20 could be incorporated into control valve 34 as seen in FIG. 3. Flow sensor 20 is preferable positioned at the junction with the pipe bracket 36 so that the entire consumption is known, but flow sensors 20 could also be positioned on both control valve 32 and release valve 34 with the resulting flow combined. Temperature sensor 14 could be mounted to control valve 32 in various locations, including be embedding temperature sensor 14 within the casing of control valve 32.

Figure 4:
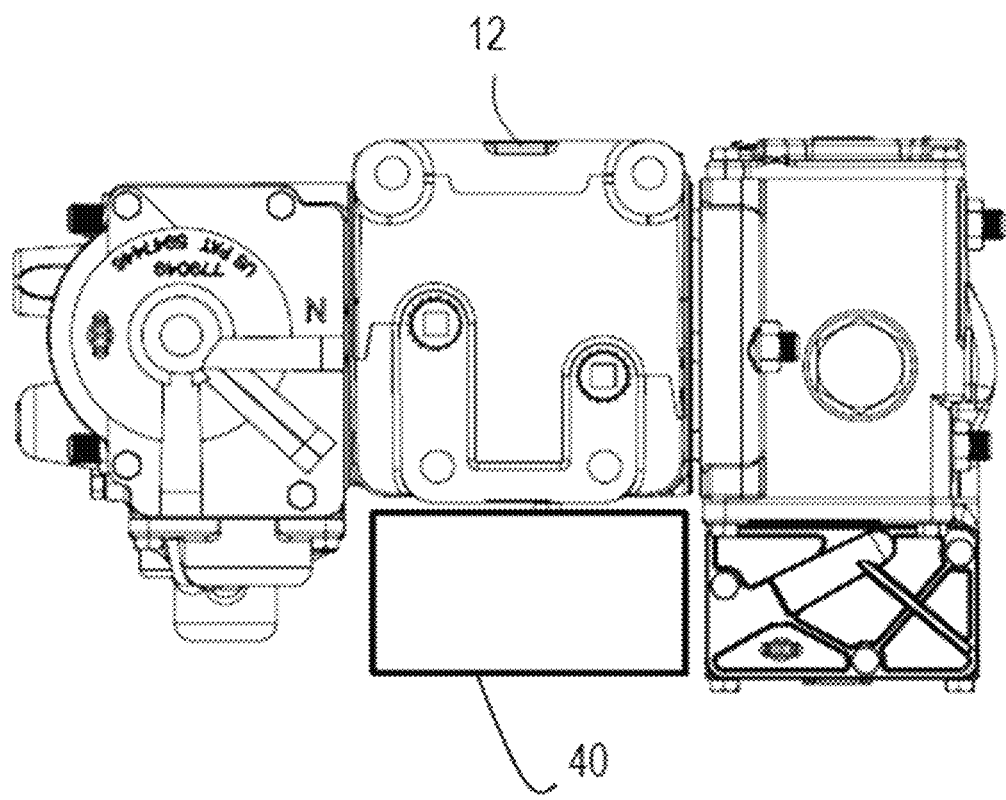
FIG. 4 is a schematic of a third option for incorporating a brake equipment wear monitoring system according to the present invention into a rail car brake valve.
Figure 5:
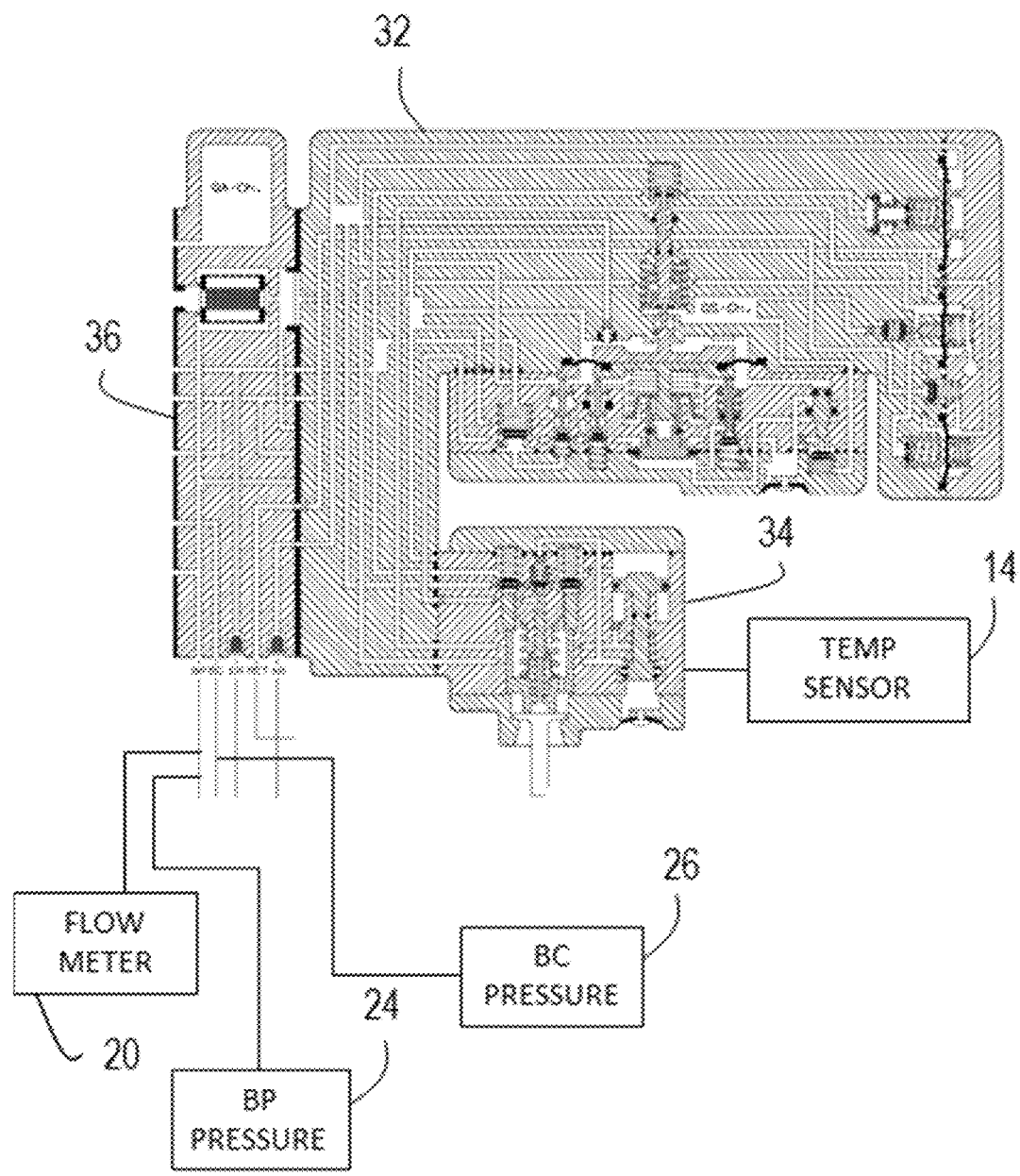
FIG. 5 is a diagram showing a fourth option for incorporating a brake equipment wear monitoring system according to the present invention into a rail car brake valve.

Alternatively, as seen in FIG. 4, system 10 may be integrated into new brake equipment 12 by coupling a housing 40 that includes system 10 and has the appropriate pneumatic interfaces of the brake equipment. More specifically, as seen in FIG. 5, flow sensor 20, brake pipe pressure sensor 24 and brake cylinder pressure sensor 26 of housing 40 can be coupled to the appropriate piping of pipe bracket 36. Temperature sensor 14 may be incorporated into the casing of release valve 34. Flow sensor 20 in this embodiment is coupled to the brake pipe pressure inlet to determine brake pipe air consumption for control valve 32 and release valve 34.

Figure 6:
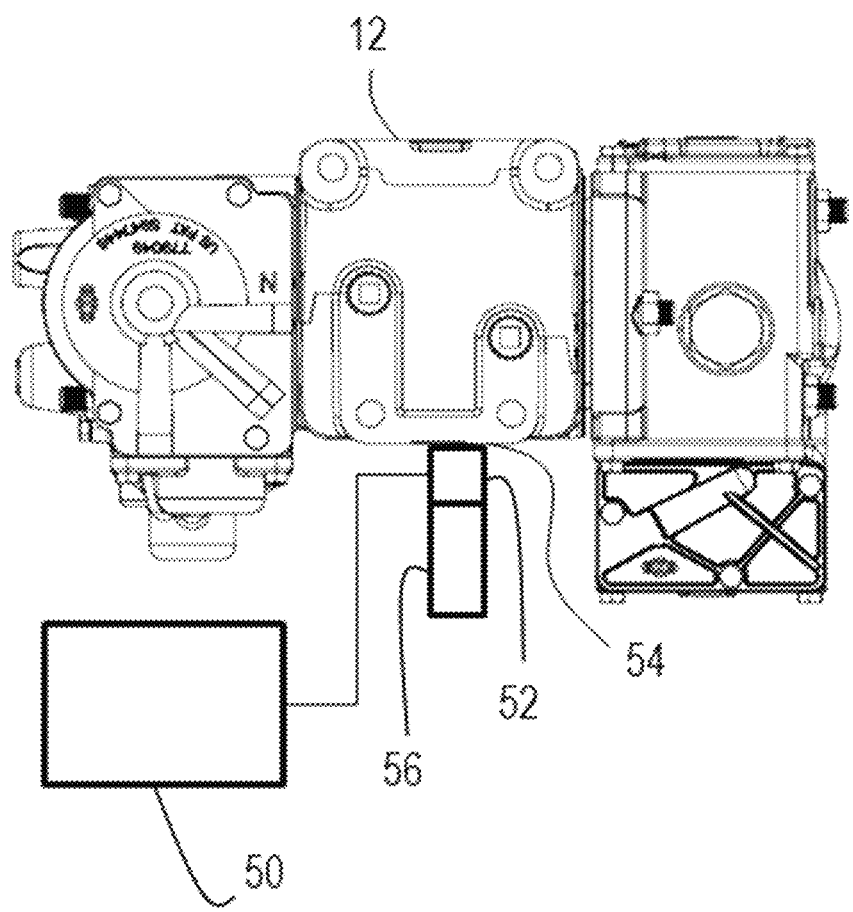
FIG. 6 is a schematic of a fifth option for incorporating a brake equipment wear monitoring system according to the present invention into a rail car brake valve.

As seen in FIG. 6, system 10 may be coupled to brake equipment 12 may be implemented in a housing 50 having a pneumatic interface 52 that can be coupled to the existing 4-port interface 54 of brake equipment 12 as the 4-port interface 54 includes the necessary pneumatic ports for system 10 to obtain the requisite pressure readings for BP pressure sensor 24 and brake cylinder sensor 26. In this embodiment, flow sensor 20 will need to be positioned remotely in the locations identified above as 4-port interface does not allow for brake pipe flow measurement. Interface 52 may replicate the connection points of 4-port interface so that testing equipment 56 may be connected to interface 52 as it would otherwise have been connected directly to 4-port interface 54.

Controller 22 is further programmed to analyze the collected data to determine that amount of wear actually experienced by brake equipment 12 that exceeds normal expected wear. For example, brake equipment 12 may have an expected lifespan based on manufacturing process and materials and a predetermined set of operational conditions, such as ambient temperature, number of service brake system cycles (brakes applied and released), emergency brake applications, etc. Thus, the expected lifespan is simply the number of years or amount of time that brake equipment 12 should last under a particular set of fixed circumstances. Actual usage of brake equipment 12, however, may occur in unexpected temperatures or involve higher than expected cycling such that the actual aging of brake equipment 12 is faster. As a result, an estimated lifespan for brake equipment 12 that based on actual usage is likely to be different, and even significantly different, than the expected lifespan minus the amount of time that brake equipment 12 has been in use.

For example, the ambient temperature in which brake equipment 12 is used may impact the rate at which equipment 12 ages. As seen in FIG. 8, higher temperatures may accelerate the diminishing of the lifespan of brake equipment 12 relative to lower temperatures. As an example, controller 22 may be programmed to calculate the additional loss of lifespan due to temperature outside normal ranges according to the following formula, which is based on the Arrhensius relationship where reaction rates double with approximately every 10 degree C. increase in temperature:

$$TIME_{Equivalent} = \frac{TIME_{actual}}{2^{\left(\frac{TEMP_{equivalent} - TEMP_{actual}}{10}\right)}}$$

Controller 22 may be programmed to track the ambient temperature in which equipment 12 is used and calculate the amount of constructive hours of additional wear experienced by brake equipment 12 over time. Referring to FIG. 8, the accumulated amount of hours of use may be totaled to determine the estimated lifespan as the expected lifespan less the constructive loss of lifespan based on the amount of wear actually experienced by equipment 12 over time, as represented in the following formula:

[estimated lifespan]=[expected lifespan]−[constructive loss of lifespan]

Once the estimated lifespan is determined, the amount of time that brake equipment 12 has been in service may be subtracted to determine the remaining useful life. System 10 of the present invention thus collects actual usage data and adjusted the expected lifespan of brake equipment 12 to determine the remaining useful life so that brake equipment 12 can be repaired or replaced before it fails.

Figure 9:
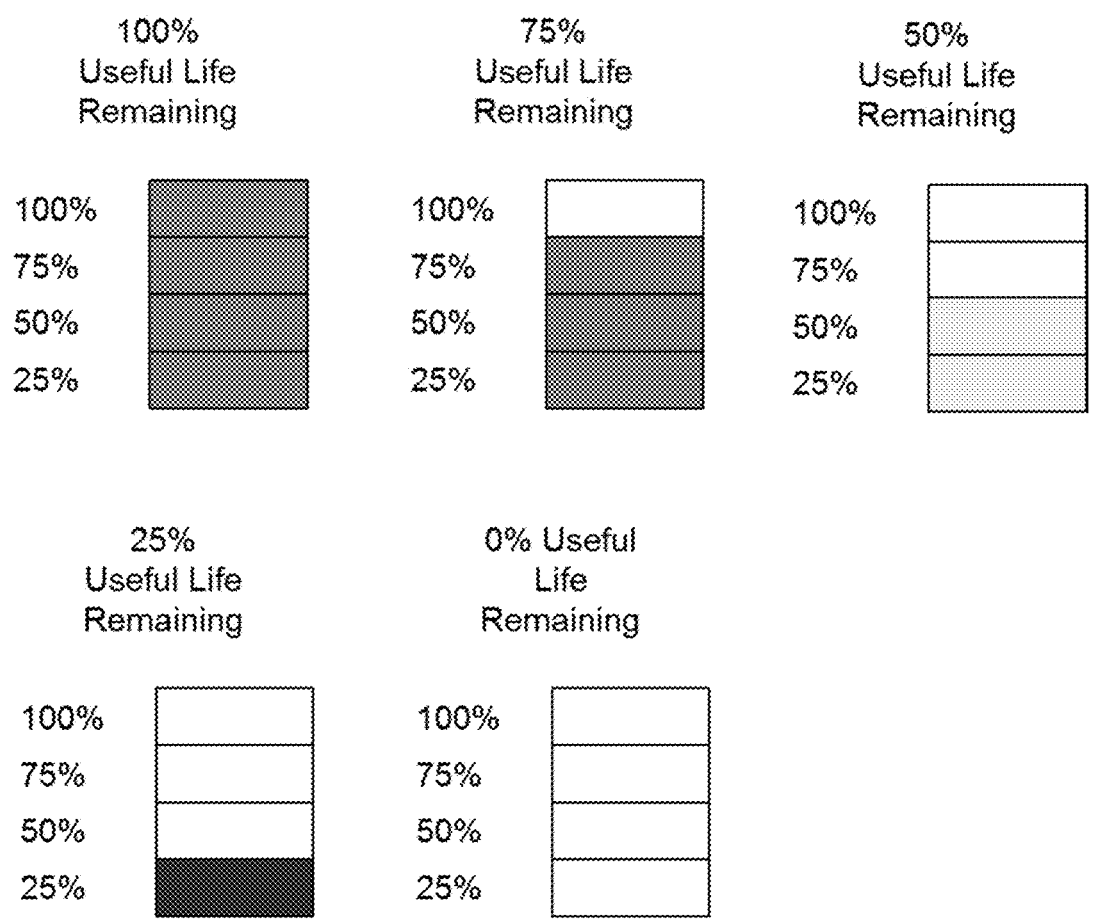
FIG. 9 is an illustration of an exemplary visual indicator for a brake equipment wear monitoring system according to the present invention into a rail car brake valve.
Figure 10:
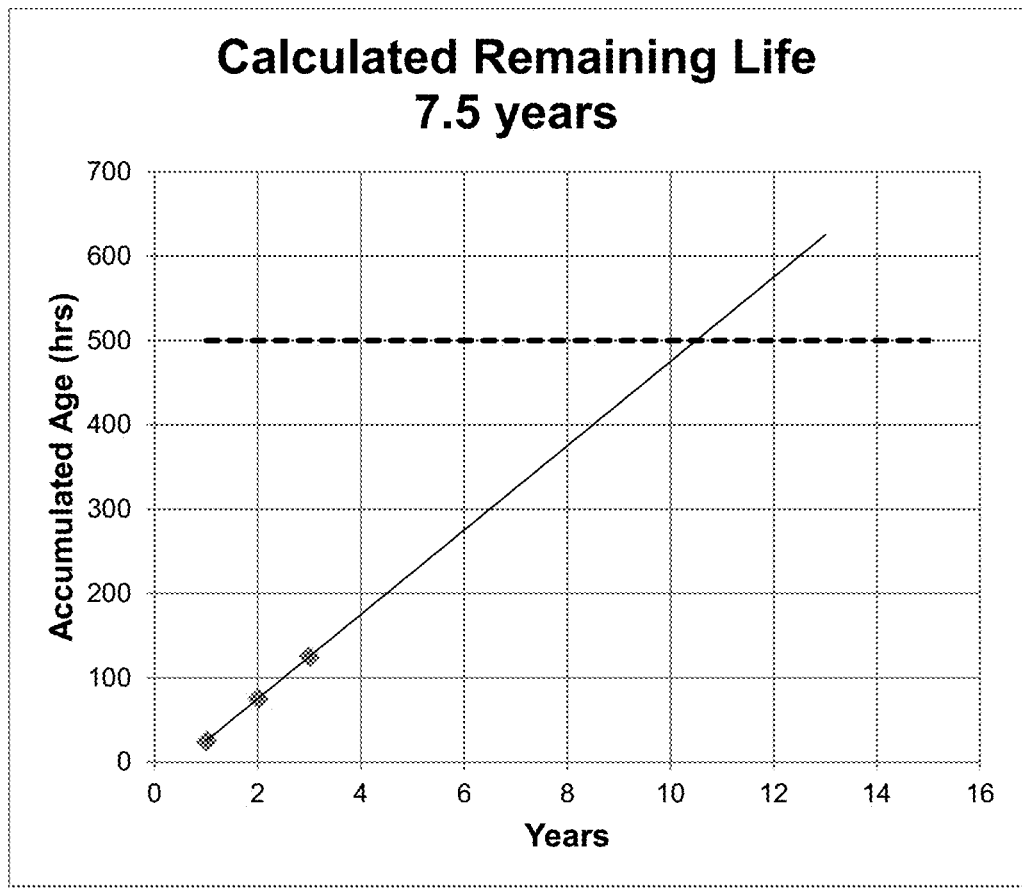
FIG. 10 is a graph of a calculation of remaining useful life based on accumulated age according to the present invention.

As seen in FIG. 8, the approach of system 10 can reveal vastly different amounts of remaining useful life of brake equipment 12 and thus can more accurate indicate when equipment 12 is in need of repair or replacement. In the hypothetical example of FIG. 8, a conventional approach that requires repair or replacement according to a set time interval based on the expected lifespan in a cold climate may allow brake equipment 12 that is used in a hot climate (only 19 percent useful life remaining) to be in use well beyond the expected repair or replace date based on a cold climate (76 percent useful life remaining), thereby jeopardizing the ability of the rail car having brake equipment 12 to brake effectively and compromising the overall safety of the train. In actual practice, brake equipment 12 may have an expected lifespan of 12 years, but the impact of a hot climate can result in an estimate lifespan closer to 8 years. Thus, brake equipment 12 that is not outfitted with system 10 could be in use for up to four years past the time when brake equipment 12 should have been repaired or replaced. Referring to FIG. 9, controller 22 may be coupled to a visual indicator 50 that provides a real-time visual indication of the remaining useful life of brake equipment 12 according to system 10. Visual indicator 50 could also comprise a numerical display with the remaining useful life in years.

Controller 22 may additionally be programmed to perform a constructive loss of lifespan calculation using brake system pressure, such as the brake pipe pressure provided by brake pipe pressure sensor 24 or the brake cylinder pressure provided by brake cylinder pressure sensor 26. For example, brake cylinder pressure from brake cylinder pressure sensor 26 may be used to count how many time the brakes are applied and released, as more frequent operation of brake equipment 12 will result in a faster loss of lifespan. Similarly, brake pipe pressure provided by brake pipe pressure sensor 24 may used to count the number of service brake applications as well as the number of emergency brake applications, thereby allowing for a determination of the number of cycles that brake equipment 12 has undergone over time. Reading the brake pipe pressure and brake cylinder pressure can also be used as a direct indication of the remaining useful life. If BP pressure sensor 24 records a 10 psi reduction in brake pipe pressure the failure of brake cylinder pressure to increase provides an indication that there is no useful life left brake equipment 12. As rail cars that are used (and braked) more frequently, brake equipment 12 will lose useful life more rapidly than rail cars that are parked, the remaining useful life calculation can be determined or modified based on cycling of the brake system. In the same manner, flow measurements taken by flow sensor 20 may be used to extrapolate the amount and nature of actual usage of brake equipment 12 so that the expected lifespan can be adjusted accordingly.

Figure 7:
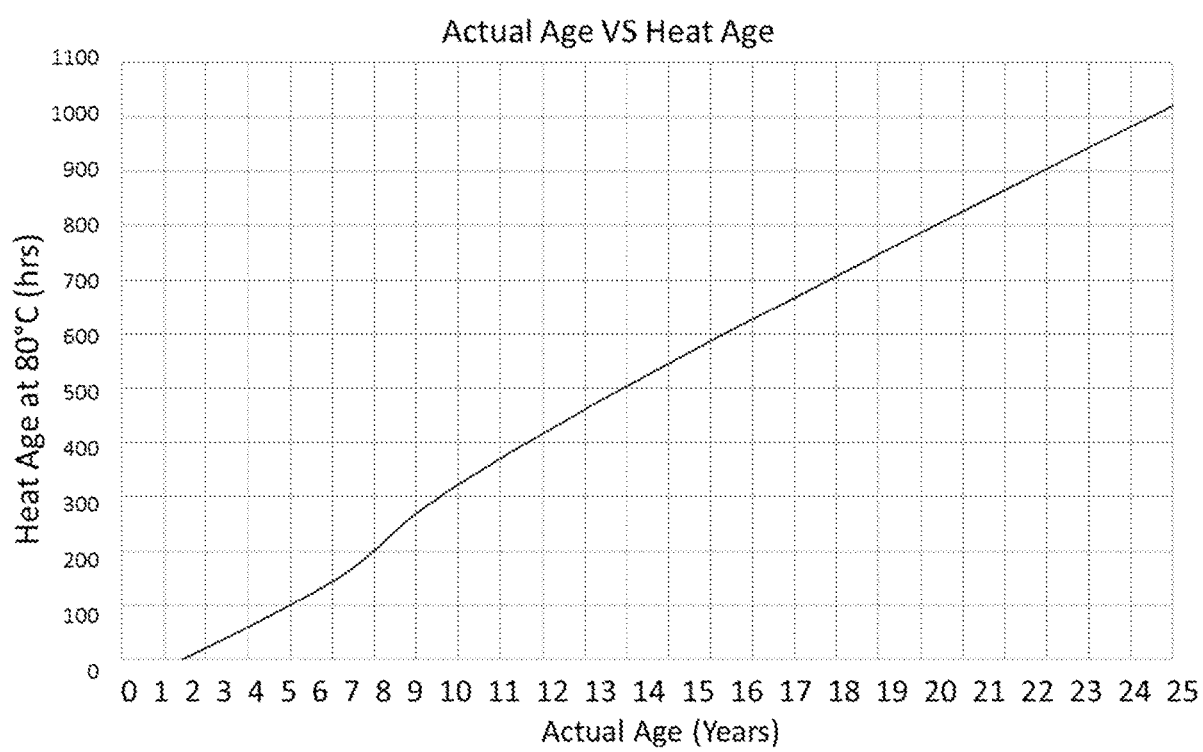
FIG. 7 is a graph of the impact of temperature on the effective age of a brake valve.
Figure 11:
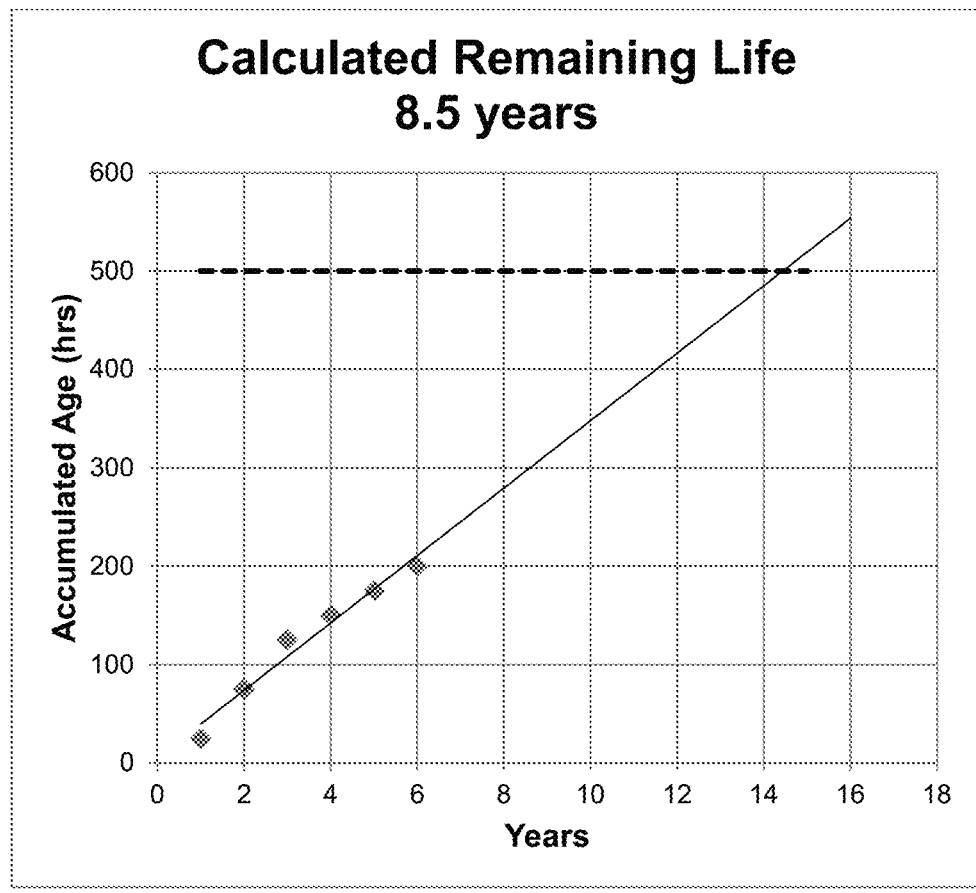
FIG. 11 is a graph of a calculation of remaining useful life based on accumulated age according to the present invention.
Figure 12:
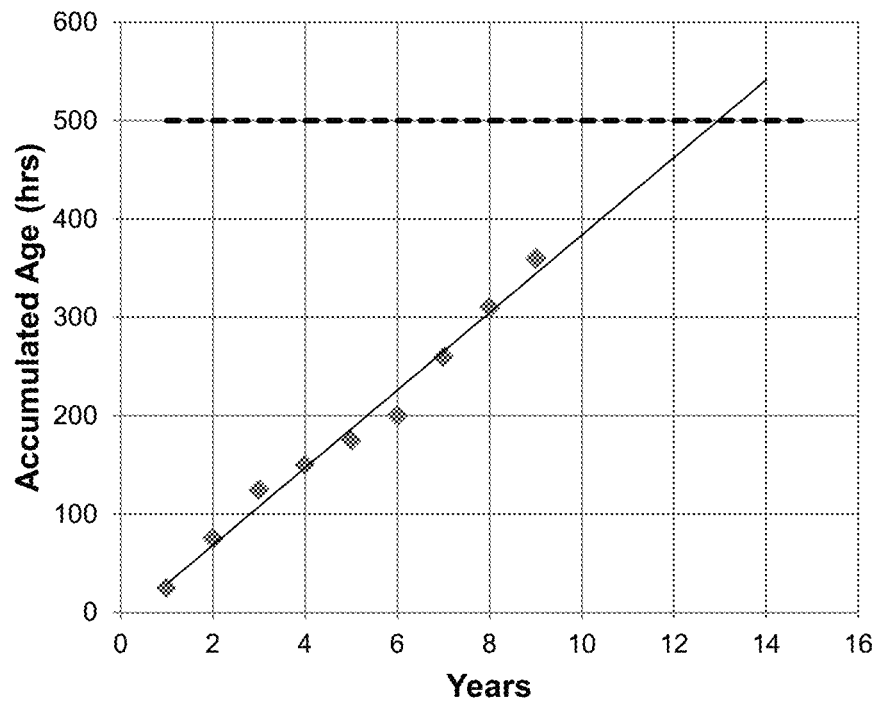
FIG. 12 is a graph of a calculation of remaining useful life based on accumulated age according to the present invention.
Figure 13:
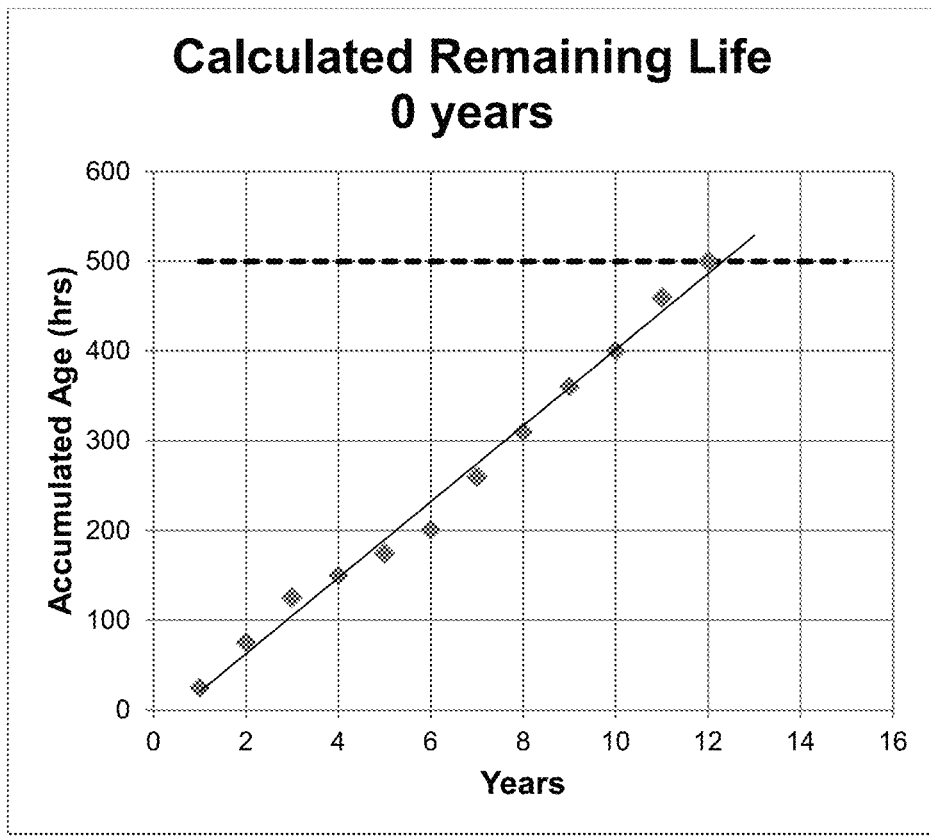
FIG. 13 is a graph of a calculation of remaining useful life based on accumulated age according to the present invention.

Referring to FIGS. 10 through 13, system 10 may be programmed to predict how much longer brake equipment 12 can last based on the temperatures experienced by brake equipment 12. Based on the sensor data described above, system 10 can calculate the accumulated age total for each year as time passes. At any point in time, system 10 can then extrapolate remaining useful life based on a plot of actual temperature over time and then determining when the trendline for the plotted actual temperatures will cross or exceed the predetermined maximum useful life (or expected lifespan). The example of FIGS. 10 through 13 assume a maximum useful life of 500 hours (dashed line) and illustrate an ongoing calculation of remaining life based on accumulated hours (adjusted based on sensor data described above) for the hypothetical data of FIG. 7. For example, at year 3 seen in FIG. 10, extrapolation of the prior actual historic data indicates that brake equipment 12 should have a total of 10.5 years of useful life, resulting in a remaining useful life determination of 7.5 years (the extrapolated crossing of the maximum useful life occurs at 10.5 years, but 3.0 years have elapsed). As brake equipment 12 continues to be used, the remaining useful life determination of 7.5 years is regularly recalculated according to actual operating conditions. As seen in FIG. 11, subsequent usage of brake equipment 12 at lower temperatures results in a deceleration of the accumulate age and a resulting extrapolation to a lifespan of 14 years. As a result, the remaining useful calculation actually increases from the estimate seen in FIG. 10. As seen in FIGS. 12 and 13, however, accumulated age may accelerate over team, leading to a point at which the calculated remaining life becomes zero, i.e., the maximum useful life is achieved.

Figure 14:
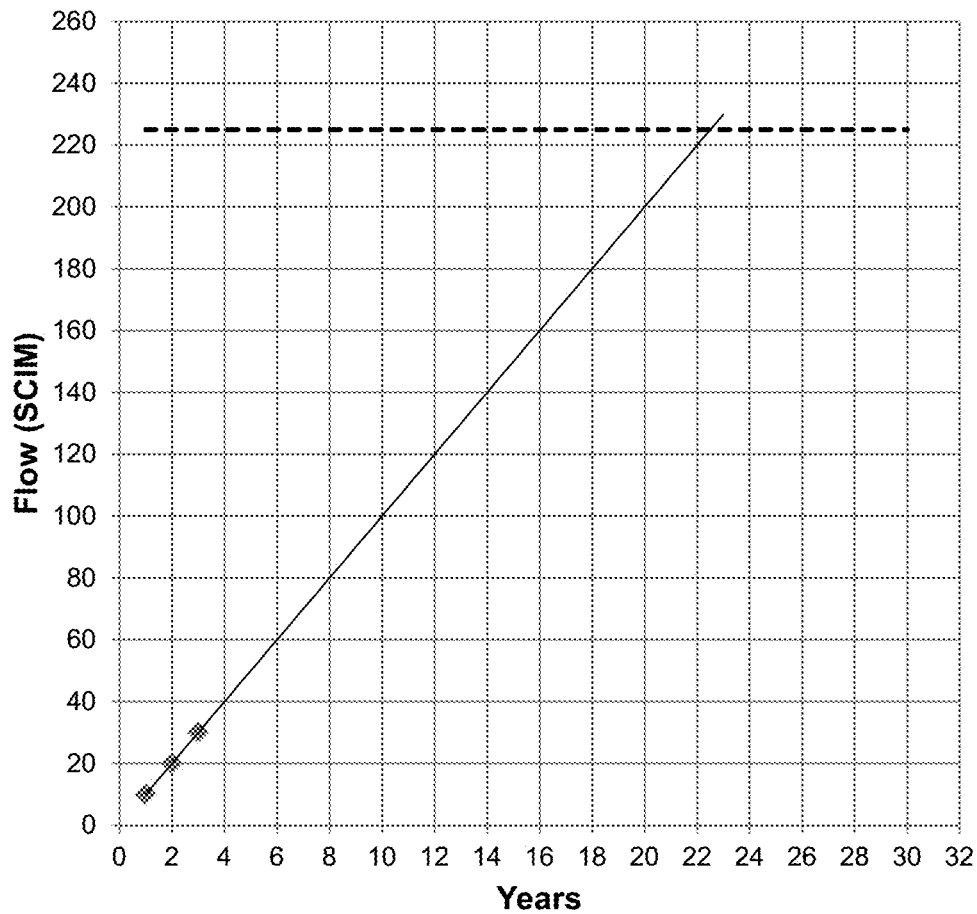
FIG. 14 is a graph of a calculation of remaining useful life based on brake pressure flow according to the present invention.
Figure 15:
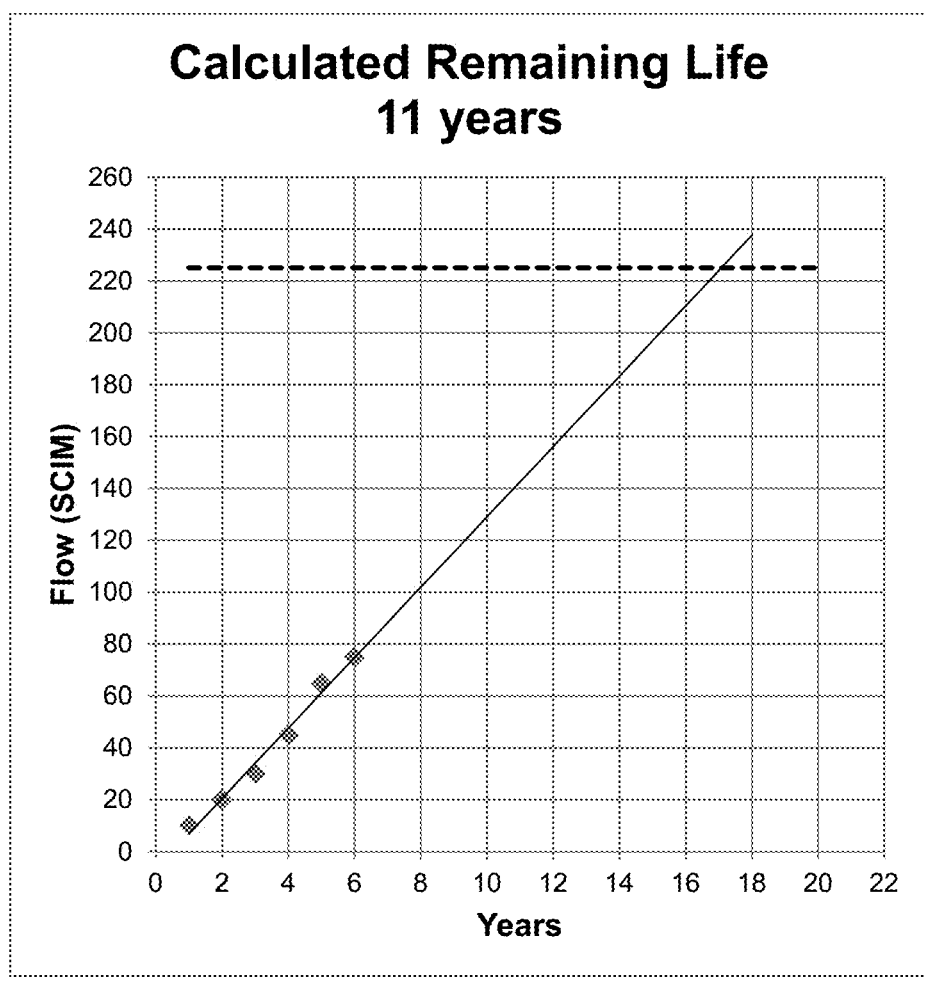
FIG. 15 is a graph of a calculation of remaining useful life based on brake pressure flow according to the present invention.
Figure 16:
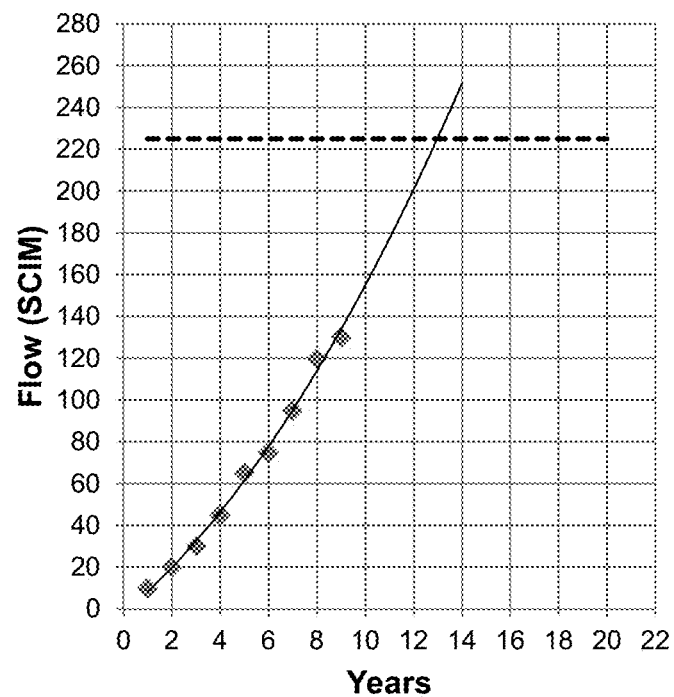
FIG. 16 is a graph of a calculation of remaining useful life based on brake pressure flow according to the present invention.
Figure 17:
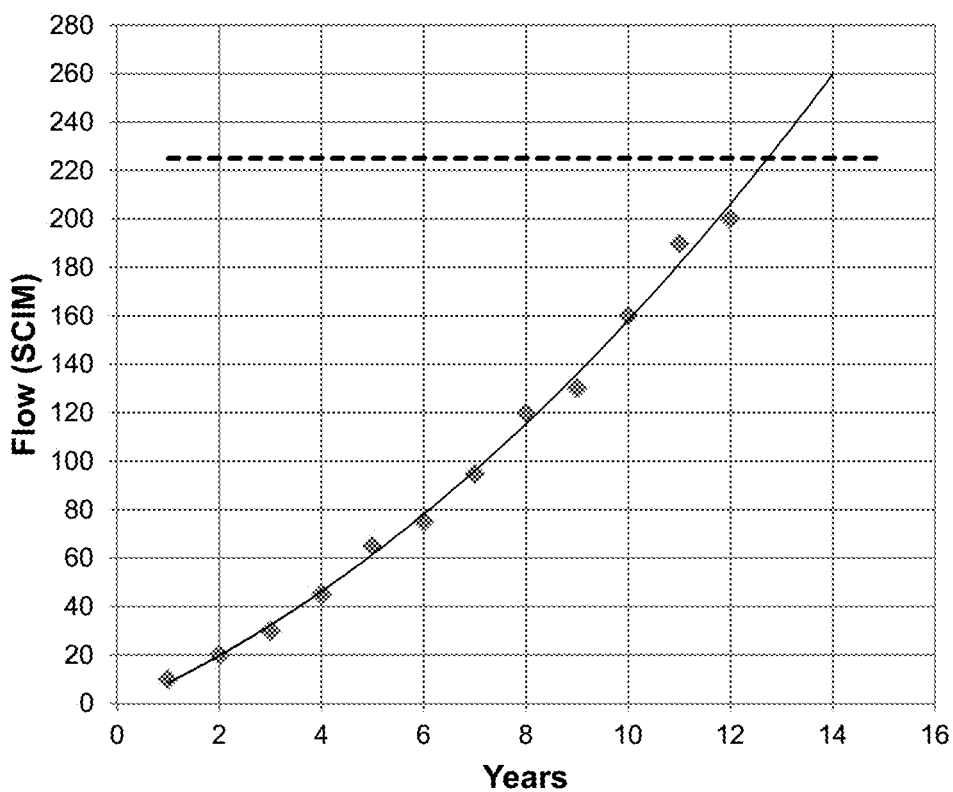
FIG. 17 is a graph of a calculation of remaining useful life based on brake pressure flow according to the present invention.

Referring to FIGS. 14 through 17, system 10 may be programmed to predict how much longer brake equipment 12 can last in years based on the flow measurements experienced by brake equipment 12. Using a system leakage maximum of 225 SCIM in flow, which is the current Association of American Railroads (AAR) limit for example, system 10 can be programmed to calculate remaining useful like over time using average leakage rate for each year. From that determination, it is possible to extrapolate the age at which brake equipment 12 will exceed the leakage maximum and thus system 10 can report the remaining useful life accordingly. It should be recognized that system 10 could be programmed to implement any desired maximum allowable leakage rates, such as the maximum leakage allowed in jurisdictions other than those governed by AAR regulations. In the hypothetical example of FIG. 14, flow data may be used to extrapolate when the actual usage of brake equipment 12 will exceed maximum useful life based on the maximum allowable system leakage. In FIG. 14, the hypothetical flow data results in a remaining useful of 19.5 years when extrapolated to determine when the increase in loss of flow over time will exceed the predetermined maximum (dashed line at 223 SCIM). As seen in FIGS. 15 through 17, however, the flow loss rate increases over time and ultimately the remaining useful life in year 12 is based on a total useful life of about 13 years and thus indicates just one year remaining.

Figure 18:
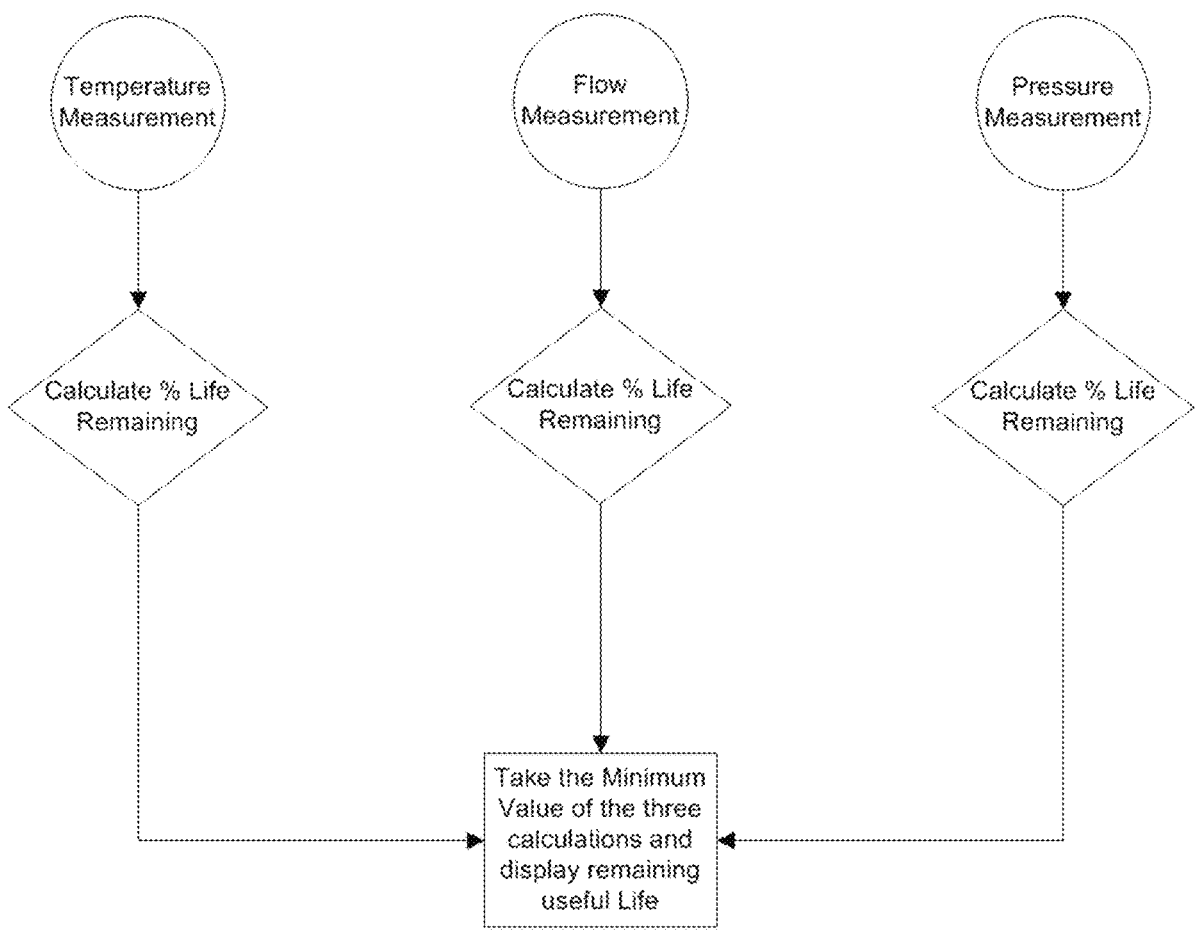
FIG. 18 is a flowchart of a method of monitoring brake equipment wear according to the present invention.

Referring to FIG. 18, system 10 may perform three separate calculations of remaining useful life based on temperature data from temperature sensor 14, flow data from flow sensor 20, and pressure data from one or more of brake pipe pressure sensor 24 and brake cylinder pressure sensor 26. The remaining useful life calculations from each of these three approaches may then be compared and the minimum of the three values used for display and decision-making, thereby ensuring the safety of brake equipment 12 is not compromised. Alternatively, one of the three approaches may be used to modify the expected lifespan to determine the estimated lifespan and either or both of the remaining two approaches used to modify, further enhance or validate the primary approach.

As described above, the present invention may be a system, a method, and/or a computer program associated therewith and is described herein with reference to flowcharts and block diagrams of methods and systems. The flowchart and block diagrams illustrate the architecture, functionality, and operation of possible implementations of systems, methods, and computer programs of the present invention. It should be understood that each block of the flowcharts and block diagrams can be implemented by computer readable program instructions in software, firmware, or dedicated analog or digital circuits. These computer readable program instructions may be implemented on the processor of a general purpose computer, a special purpose computer, or other programmable data processing apparatus to produce a machine that implements a part or all of any of the blocks in the flowcharts and block diagrams. Each block in the flowchart or block diagrams may represent a module, segment, or portion of instructions, which comprises one or more executable instructions for implementing the specified logical functions. It should also be noted that each block of the block diagrams and flowchart illustrations, or combinations of blocks in the block diagrams and flowcharts, can be implemented by special purpose hardware-based systems that perform the specified functions or acts or carry out combinations of special purpose hardware and computer instructions.

What is claimed is:

1. A system for monitoring usage of rail car brake equipment, comprising:
   a sensor for collecting and outputting data regarding a parameter indicating how a brake system component has been used over time, wherein the brake system component has an expected lifespan, wherein the sensor comprises a temperature sensor that can output the ambient temperature and the parameter is the ambient temperature; and
   a controller coupled to the sensor that is programmed to receive the data regarding the parameter and to determine an estimated lifespan for the brake system component that is different than the expected lifespan by calculating how much the ambient temperature over time has increased the rate of aging of the brake system component over time such that the estimated lifespan of the brake system component is less than the expected lifespan.

2. The system of claim 1, further comprising a flow sensor that can determine an amount of air used by a braking system that includes the brake system component.

3. The system of claim 1, further comprising a pressure sensor that can determine an amount of pressure in a brake pipe of a braking system that includes the brake system component.

4. The system of claim 1, further comprising a pressure sensor that can determine an amount of pressure in a brake cylinder of a braking system that includes the brake system component.

5. The system of claim 1, wherein the controller is programmed to determine how the parameter impacts the expected lifespan of the brake system component by calculating a constructive loss of lifespan.

6. The system of claim 5, wherein the controller is programmed to calculate the constructive loss of lifespan by tracking an accumulated age over time.

7. The system of claim 6, wherein the controller is programmed to calculate a remaining useful life from the expected lifespan.

8. The system of claim 1, wherein the controller is programmed to calculate the remaining useful life by subtracting an amount of time that the brake system component has been in use from the estimated lifespan.

9. The system of claim 8, further comprising a display coupled to the controller, wherein the controller is programmed to drive the display to provide a visual indication of the remaining useful life.

10. A method for monitoring usage of rail car brake equipment, comprising the steps of:
    providing a sensor for collecting and outputting data regarding a parameter indicating how a brake system component has been used over time and a controller that is coupled to the sensor, wherein the sensor comprises a temperature sensor that can output the ambient temperature and the parameter is the ambient temperature;
    receiving the data regarding the parameter indicating how the brake system component has been used with the controller; and
    determining whether the parameter has caused the brake system component to have an estimated lifespan that is different than an expected lifespan of the brake system component by calculating how much the ambient temperature over time has increased the rate of aging of the brake system component over time such that the estimated lifespan of the brake system component is less than the expected lifespan.

11. The method of claim 10, wherein the step of determining whether the parameter has caused the brake system component to have an estimated lifespan that is different than the expected lifespan comprising the step of calculating a constructive loss of lifespan based upon tracking of the at least one parameter over time.

12. The method of claim 11, wherein the constructive loss of lifespan is based upon at least one of ambient temperature data collected over time, brake system air flow data collected over time, and brake system cycling data collected over time.

13. The method of claim 12, further comprising the step of calculating a remaining useful life by subtracting an amount of time that the brake system component has been in use from the expected lifespan of the brake system component.

14. The method of claim 10, further comprising the step of displaying the remaining useful life.

\* \* \* \* \*